United States Patent [19]
Pearce

[11] Patent Number: 6,020,055
[45] Date of Patent: *Feb. 1, 2000

[54] CUSHIONING MEDIA INCLUDING LUBRICATED SPHERICAL OBJECTS

[75] Inventor: Tony M. Pearce, Alpine, Utah

[73] Assignees: TekSource, LC; Nike, Inc., both of Draper, Utah

[*] Notice: This patent is subject to a terminal disclaimer.

[21] Appl. No.: 08/692,635

[22] Filed: Aug. 6, 1996

Related U.S. Application Data

[63] Continuation of application No. 08/472,011, Jun. 5, 1995, Pat. No. 5,549,743, which is a continuation-in-part of application No. 08/081,467, Jun. 22, 1993, Pat. No. 5,421,874.

[51] Int. Cl.⁷ ...................................................... B32B 5/16
[52] U.S. Cl. ........................... 428/323; 106/122; 428/325; 428/327; 428/331; 428/338; 428/339
[58] Field of Search ................................. 428/323, 331, 428/327, 325, 338, 339; 106/112; 501/32

[56] References Cited

U.S. PATENT DOCUMENTS

| | | | |
|---|---|---|---|
| 2,491,557 | 12/1949 | Goolsbee | 5/348 |
| 2,655,369 | 10/1953 | Musilli | 267/1 |
| 2,672,183 | 3/1954 | Forsyth | 155/179 |
| 2,814,053 | 11/1957 | Sevcik | 5/348 |
| 3,407,406 | 10/1968 | Werner et al. | 2/3 |
| 3,459,179 | 8/1969 | Olesen | 128/60 |
| 3,462,778 | 8/1969 | Whitney | 5/347 |
| 3,518,786 | 7/1970 | Holtvoigt | 46/24 |
| 3,529,368 | 9/1970 | Canfield | 36/2.5 |
| 3,552,044 | 1/1971 | Wiele | 36/71 |
| 3,605,145 | 9/1971 | Graebe | 5/706 |
| 3,748,669 | 7/1973 | Warner | 5/682 |
| 3,748,779 | 7/1973 | Cherk et al. | 46/115 |
| 3,801,265 | 4/1974 | McGrew | 5/348 |
| 3,801,420 | 4/1974 | Anderson | 161/50 |
| 3,870,265 | 3/1975 | Graebe | 425/93 |
| 3,893,198 | 7/1975 | Blair | 5/699 |
| 3,968,530 | 7/1976 | Dyson | 5/338 |
| 3,986,213 | 10/1976 | Lynch | 623/8 |
| 4,038,762 | 8/1977 | Swan, Jr. | 36/89 |
| 4,083,127 | 4/1978 | Hanson | 36/93 |
| 4,144,658 | 3/1979 | Swan, Jr. | 36/117 |

(List continued on next page.)

FOREIGN PATENT DOCUMENTS

| | | | |
|---|---|---|---|
| 0 614 622 A2 | 9/1994 | European Pat. Off. | A43B 5/04 |
| 1106958 | 3/1968 | United Kingdom | A63B 5/04 |
| 1261475 | 1/1972 | United Kingdom . | |
| 2 150 431 | 7/1985 | United Kingdom | A47C 27/08 |
| WO 91/04290 | 4/1991 | WIPO | C08J 9/22 |
| WO 92/14387 | 9/1992 | WIPO | A47C 7/42 |
| WO 96/39065 | 12/1996 | WIPO | A47C 4/54 |
| WO 97/17001 | 5/1997 | WIPO | A47C 27/12 |

*Primary Examiner*—H. Thi Le
*Attorney, Agent, or Firm*—Daniel McCarthy; Brick G. Power; Mark G. Sandbaken

[57] ABSTRACT

A composite mixture of spherical objects and lubricant useful for its cushioning properties is disclosed and claimed. The composite mixture may be composed of microspheres typically less than 2000 microns in diameter with inert atmospheres sealed within their interiors and any of a variety of lubricants facilitating sliding and rolling movement between microspheres. Typically the composite mixture includes lubricant in a quantity sufficient to substantially coat the exterior surface of essentially all of the spherical objects, but in a quantity less than would cause dispersion of the spherical objects in the lubricant sufficient to physically separate the spherical objects from each other and substantially reduce the sliding and rolling contact of the spherical objects with each other. Low specific gravity, low thermal mass, low coefficient of heat transfer, lack of head pressure, insulative and flotation qualities are provided by the invention. The composite mixture may be contained in fluid-tight confinement within a flexible bladder. The preferred bladder has a stretchable fabric laminated to an impermeable, stretchable film.

13 Claims, 6 Drawing Sheets

U.S. PATENT DOCUMENTS

| | | | |
|---|---|---|---|
| 4,163,297 | 8/1979 | Neumark | 5/446 |
| 4,229,546 | 10/1980 | Swan, Jr. | 521/55 |
| 4,243,754 | 1/1981 | Swan, Jr. | 521/55 |
| 4,247,963 | 2/1981 | Reddi | 5/687 |
| 4,252,910 | 2/1981 | Schaefer | 521/145 |
| 4,255,202 | 3/1981 | Swan, Jr. | 106/122 |
| 4,256,304 | 3/1981 | Smith et al. | 273/60 B |
| 4,274,169 | 6/1981 | Standiford | 5/502 |
| 4,279,044 | 7/1981 | Douglas | 5/453 |
| 4,292,701 | 10/1981 | Woychick | 5/422 |
| 4,335,476 | 6/1982 | Watkin | 5/464 |
| 4,335,478 | 6/1982 | Watkin | 5/740 |
| 4,369,284 | 1/1983 | Chen | 524/476 |
| 4,370,769 | 2/1983 | Herzig et al. | 5/452 |
| 4,422,194 | 12/1983 | Viesturs et al. | 5/451 |
| 4,467,053 | 8/1984 | Markle | 521/128 |
| 4,472,847 | 9/1984 | Gammons et al. | 5/453 |
| 4,483,029 | 11/1984 | Paul | 5/689 |
| 4,485,505 | 12/1984 | Paul | 5/714 |
| 4,485,568 | 12/1984 | Landi et al. | 36/44 |
| 4,498,205 | 2/1985 | Hino | 5/689 |
| 4,541,136 | 9/1985 | Graebe | 5/456 |
| 4,572,174 | 2/1986 | Eilender et al. | 128/889 |
| 4,588,229 | 5/1986 | Jay | 297/459 |
| 4,618,213 | 10/1986 | Chen | 350/96.34 |
| 4,628,557 | 12/1986 | Murphy | 5/446 |
| 4,660,238 | 4/1987 | Jay | 5/431 |
| 4,686,724 | 8/1987 | Bedford | 5/468 |
| 4,698,864 | 10/1987 | Graebe | 5/441 |
| 4,709,431 | 12/1987 | Shaktman | 5/481 |
| 4,713,854 | 12/1987 | Graebe | 5/652 |
| 4,726,624 | 2/1988 | Jay | 297/459 |
| 4,728,551 | 3/1988 | Jay | 428/76 |
| 4,737,998 | 4/1988 | Johnson, Sr. | 5/422 |
| 4,744,564 | 5/1988 | Yamada | 273/232 |
| 4,761,843 | 8/1988 | Jay | 5/431 |
| 4,842,330 | 6/1989 | Jay | 297/4 |
| 4,913,755 | 4/1990 | Grim | 156/145 |
| 4,945,588 | 8/1990 | Cassidy et al. | 5/451 |
| 4,952,190 | 8/1990 | Tarnoff et al. | 446/267 |
| 4,952,439 | 8/1990 | Hanson | 428/72 |
| 4,953,913 | 9/1990 | Graebe | 297/459 |
| 5,010,608 | 4/1991 | Barnett et al. | 5/453 |
| 5,013,518 | 5/1991 | Gilroy et al. | 5/453 |
| 5,015,313 | 5/1991 | Drew et al. | 156/87 |
| 5,018,790 | 5/1991 | Jay | 297/458 |
| 5,020,176 | 6/1991 | Dotson | 5/453 |
| 5,027,801 | 7/1991 | Grim | 128/80 H |
| 5,039,567 | 8/1991 | Landi et al. | 428/116 |
| 5,052,068 | 10/1991 | Graebe | 5/455 |
| 5,053,436 | 10/1991 | Delgado | 521/64 |
| 5,058,291 | 10/1991 | Hanson | 36/117 |
| 5,074,620 | 12/1991 | Jay et al. | 297/337 |
| 5,079,786 | 1/1992 | Rojas | 5/450 |
| 5,079,787 | 1/1992 | Pollman | 5/655.4 |
| 5,093,138 | 3/1992 | Drew et al. | 426/68 |
| 5,100,712 | 3/1992 | Drew et al. | 428/68 |
| 5,103,518 | 4/1992 | Gilroy et al. | 5/453 |
| 5,111,544 | 5/1992 | Graebe | 5/470 |
| 5,147,685 | 9/1992 | Hanson | 428/189 |
| 5,149,173 | 9/1992 | Jay et al. | 297/284.9 |
| 5,152,023 | 10/1992 | Graebe | 5/654 |
| 5,163,196 | 11/1992 | Graebe et al. | 5/654 |
| 5,171,766 | 12/1992 | Mariano et al. | 523/218 |
| 5,180,619 | 1/1993 | Landi et al. | 428/116 |
| 5,190,504 | 3/1993 | Scatterday | 482/49 |
| 5,191,752 | 3/1993 | Murphy | 54/44.5 |
| 5,201,780 | 4/1993 | Dinsmoor et al. | 5/455 |
| 5,203,607 | 4/1993 | Landi . | |
| 5,204,154 | 4/1993 | Drew et al. | 428/68 |
| 5,211,446 | 5/1993 | Jay et al. | 297/444 |
| 5,224,863 | 7/1993 | Lauer et al. | 434/267 |
| 5,255,404 | 10/1993 | Dinsmoor et al. | 5/677 |
| 5,262,468 | 11/1993 | Chen | 524/476 |
| 5,282,286 | 2/1994 | MacLeish | 5/654 |
| 5,289,878 | 3/1994 | Landi et al. | 168/14 |
| 5,314,735 | 5/1994 | Aiken | 428/116 |
| 5,330,249 | 7/1994 | Weber et al. | 297/214 |
| 5,334,646 | 8/1994 | Chen | 524/474 |
| 5,334,696 | 8/1994 | Olson et al. | 528/322 |
| 5,335,907 | 8/1994 | Spector | 273/58 |
| 5,336,708 | 8/1994 | Chen | 524/474 |
| 5,352,023 | 10/1994 | Jay et al. | 297/452.21 |
| 5,355,907 | 10/1994 | Spector | 273/58 H |
| 5,360,653 | 11/1994 | Ackley | 428/71 |
| 5,362,834 | 11/1994 | Schapel et al. | 528/58 |
| 5,369,828 | 12/1994 | Graebe | 5/654 |
| 5,403,642 | 4/1995 | Landi et al. | 428/116 |
| 5,421,874 | 6/1995 | Pearce | 106/122 |
| 5,429,852 | 7/1995 | Quinn | 428/71 |
| 5,444,881 | 8/1995 | Landi et al. | 5/653 |
| 5,445,861 | 8/1995 | Newton et al. | 428/116 |
| 5,456,072 | 10/1995 | Stern | 54/44.5 |
| 5,490,299 | 2/1996 | Dinsmoor, III et al. | 5/654 |
| 5,496,610 | 3/1996 | Landi et al. | 428/116 |
| 5,508,334 | 4/1996 | Chen | 524/474 |
| 5,549,743 | 8/1996 | Pearce | 106/122 |
| 5,557,723 | 9/1996 | DiResta et al. | 273/58 H |
| 5,592,706 | 1/1997 | Pearce | 5/654 |
| 5,617,595 | 4/1997 | Landi et al. | 5/428 |
| 5,626,657 | 5/1997 | Pearce | 106/122 |
| 5,636,395 | 6/1997 | Serda | 5/691 |
| 5,689,845 | 11/1997 | Sobieralski et al. | 5/654 |

CUSHIONING MEDIA INCLUDING LUBRICATED SPHERICAL OBJECTS

This patent application is a continuation application of Ser. No. 08/472,011 which was filed on Jun. 5, 1995 now U.S. Pat. No. 5,549,743, which is a continuation-in-part of U.S. patent application Ser. No. 08/081,467, filed Jun. 22, 1993 now U.S. Pat. No. 5,421,874, and priority is claimed thereto for all of the material disclosed either explicitly or inherently therein.

BACKGROUND OF THE INVENTION

A. Field of the Invention

This invention relates to the field of lightweight flowable and shearable materials including materials for cushions and padding, such as seat cushions or bed pads, where skin comfort and skin preservation are important. More particularly, this invention relates to a composite mixture of a lubricant and spherical objects which may be encased within a flexible container or sack and used as a cushion or padding. The exterior surfaces of the spherical objects are lightly lubricated to accommodate flow and shear, but lubricant is not used in an amount sufficient to cause dispersion of the spherical objects in the lubricant. Additionally, the mixture is adapted to minimize memory which would cause it to move, flow or change shape when a deforming force is removed. The composite mixture has a very low specific gravity, making it excellent for use with lightweight vehicles such as wheelchairs and bicycles, and which makes it an excellent flotation material.

B. The Background Art

In the prior art there has been substantial difficulty in designing padding or cushions for contact with a patient's skin that have some or all of the following characteristics: (i) equalization of pressure across the entire area of skin contacted in order to prevent skin damage, (ii) readily flowable, (iii) low shearing force threshold, (iv) no or minimal memory, (v) low specific gravity, (vi) lightweight, (vii) comprises flowable material which has some or all of the following characteristics: (a) capable of being contained in a flexible, elastic bladder without leakage, (b) does not substantially vary in performance with temperature, (c) does not break down or separate into its constituent components over time, (d) does not feel overly cold to the touch, and (e) quickly warms to body temperature. The prior art has also been unable to design a flotation material which has a low specific gravity for buoyancy but is not stiff or semi-rigid and therefore somewhat uncomfortable for the wearer of a life vest containing such material.

For example, the typical prior art wheelchair seat consists of a fabric sling stretched between two metal bars on which the patient sits. Frequently the sling has a plastic or rubber coating for durability. Sling seats such as this are unable to conform to the shape of the human body, resulting in greater force being applied to some portions of the patient's anatomy than to others. Over time, high spots or bony areas on the patient's body often develop decubitus ulcers (pressure sores) or other tissue damage. Sling seats typically also have a high shearing force threshold, being resistent to movement or turning in response to movement by the patient. As the patient turns or moves within the seat, friction with the patient's body would tend to move the portion of the seat in direct contact with the patient's body. All portions of the typical seat, however, are typically held fast together, whether by monolithic construction, such as in foam seats, with stitching as in sling seats, or otherwise. The resulting high shearing force threshold causes tissue damage during turning or movement. Tissue damage from shear-resistant seats can be cumulative and debilitating over time. Foams and other traditional types of cushions and padding have provided little relief from the disadvantages of sling seats. For example, patients confined to bed typically experience the same skin damage as those using a sling seat even though mattresses usually include a combination of metal springs, foam padding and cotton or synthetic batting.

The previous solution to the problems of typical cushions and padding has been gel or viscous and slimy liquids (hereinafter "fluid") contained within a flexible bag or bladder. The use of fluid within a flexible bladder for contact with a patient's body achieves much more uniform force or pressure on irregular body surfaces than traditional cushions and padding. The shearing force threshold of fluid within a bladder may be lower than in other cushions or pads because the bladder surface closest to the patient's body is free, within certain limits, to move with the patient's body as the patient moves. The bladder walls are not anchored to the gel so that as the patient moves, the bladder may move with respect to the gel. The fluid also has some ability to shear with respect to itself. The result is a seat which is less damaging to human skin than a typical sling seat. Unfortunately, most viscous fluids are very slow to respond to body movement, giving an undesirably high shearing force during quick body movement and failing to fully preserve the integrity of the patient's skin. Fluid within a bladder is currently used as padding in some wheelchair and bicycle seats. Such fluid are also very heavy, even when hollow microbeads are dispersed in the fluid. Further, prior art fluids flow under their own weight, causing them to exert a "ahead pressure" on bony protuberances of the body, causing skin damage and discomfort. Further, some prior art fluids have memory, exerting a force on bony protuberances of the body, as they try to return to shape, increasing the likelihood of tissue damage.

Fluid has the disadvantage of being much heavier than the flexible foam used in typical cushions. Fluids commonly used in cushioning have specific gravities of 0.6 to 1.2, whereas a typical cushion foam may have a specific gravity of only 0.05 to 0.10. Thus, in order to achieve a lightweight seat, fluid must be used sparingly. When fluid is used sparingly, its positive characteristics are minimized. Use of gels in sufficient quantity to achieve the desired effect results in a seat weight unacceptable for many applications. For example, patients using wheelchairs commonly suffer from a weakened physical condition, and an increase in the weight of a wheelchair by only a few pounds can make it excessively burdensome for the patient to use. As another example, total bicycle weight is typically a primary consideration in the design of both road bikes and mountain bikes. The additional weight of a fluid seat is often unacceptable to all but the most casual of riders.

Another disadvantage of such gels is that they have a high thermal mass and a high coefficient of heat transfer. As a result, fluid seats typically feel cold to the touch, providing initial discomfort to the user and remain cold for long periods of time before warming. Fluids used in cushioning also exhibit substantial viscosity changes with temperature, causing them to become more viscous and lose their functional characteristics in cold temperatures. Similarly, in very warm temperatures, such fluids will exhibit excessive flow characteristics and again will not function as desired. Finally, fluids used in cushioning which have hollow microspheres dispersed therein will tend to break down and separate into their constituent components over time, causing a loss of functional characteristics. The user of such a fluid cushion must, therefore, periodically knead the cushion to re-mix the components of the fluid and keep it functioning. Kneading a fluid cushion can be difficult or impossible for many wheelchair users because of the hand strength required, making a fluid cushion very undesirable.

U.S. patents to Terrence M. Drew et al. issued Mar. 3, 1992 (U.S. Pat. No. 5,093,138) and Mar. 31, 1992 (U.S. Pat. No. 5,100,712) describe a flowable, pressure compensating composition including water, a material for increasing the viscosity of water, and spherical particles dispersed throughout the volume of the water. Both of these patents are hereby incorporated by reference in their entirety. The composition disclosed in these patents is a deformable fluid which has the disadvantages of substantial weight, memory, and being slow to flow or shear in response to a deforming pressure, thus being prone to cause skin damage.

U.S. patents to Chris A. Hanson issued Oct. 22, 1991 (U.S. Pat. No. 5,058.291) and Aug. 28, 1990 (U.S. Pat. No. 4,952,439) describe padding devices which are resistant to flow in response to an instantly applied pressure. These two patents are hereby incorporated by reference in their entirety. The padding disclosed in these patents has the disadvantage of being slow to flow in response to pressure, thus having a high shearing force and being prone to cause skin damage. The materials disclosed in these patents also have memory, causing them to tend to return to their original shape after removal of a deforming pressure. The memory of the material causes the material to exert additional pressure on protuberances of the body, such as on bony areas, increasing the risk of tissue damage. Typically, material having memory has a high shear force as well, increasing skin damage during use. Memory is described in U.S. patents to Chris A. Hanson issued Sep. 15, 1992, (U.S. Pat. No. 5,147,685), Terrence M. Drew issued Apr. 20, 1993 (U.S. Pat. No. 5,204,154), Chris A. Hanson issued Aug. 28, 1990 (U.S. Pat. No. 4,952,439), Thomas F. Canfield issued Sep. 22, 1970 (U.S. Pat. No. 3,529,368), Terrence M. Drew et al. issued Mar. 3, 1992 (U.S. Pat. No. 5,093,138), Chris A. Hanson issued Oct. 22, 1991 (U.S. Pat. No. 5,058,291) and Terrence M. Drew, et al. issued Mar. 31, 1992 (U.S. Pat. No. 5,100,712) each of which is incorporated by reference in its entirety.

U.S. Pat. No. 3,529,368 to Thomas F. Canfield issued Sep. 22, 1970 discloses a pad filled with a quickly conforming material, such as elastomeric particles covered with a lubricant (Canfield at column 3, lines 24–29). Canfield does not disclose, however, substantially unrestricted movement of lubricated spherical objects in all three dimensions, as included in Applicant's invention. Canfield also does not disclose the use of a highly lubricous (or friction reducing) lubricant that substantially reduces the coefficient of friction between spherical objects. Canfield also does not disclose a lubricant designed not to impede the sliding and rolling of microspheres with respect to each other. Further, Canfield fails to disclose the readily flowing and shearing action of the invented composite mixture in response to deforming pressure exerted on it, the flowing and shearing action being accomplished by spherical objects moving in sliding and rolling contact with each other. It is of note that Canfield's FIG. 4 discloses lubricated elastomeric particles of irregular shape (i.e. not spherical). Objects of irregular shape, even if lubricated, would not achieve low friction sliding and rolling with respect to each other in order to achieve ready flow and shear under pressure. Further, the Canfield elastomeric particles would by nature have memory, a negative attribute that the invention strives to eliminate.

U.S. patents to Eric C. Jay issued Mar. 1, 1988, (U.S. Pat. No. 4,728,551), Jack C. Swan, Jr. issued Jan. 6, 1981 (U.S. Pat. No. 4,243,754), Jack C. Swan, Jr. issued Jan. 6, 1981 (U.S. Pat. No. 4,229,546), Jack C. Swan, Jr. issued Jan. 6, 1981 (U.S. Pat. No. 4,255,202), Jack C. Swan, Jr. issued Jan. 6, 1981 (U.S. Pat. No. 4,144,658), Jack C. Swan, Jr. issued Jan. 6, 1981 (U.S. Pat. No. 4,038,762), Henry Wilfred Lynch issued Oct. 19, 1976 (U.S. Pat. No. 3,986,213) and Frederick L. Warner issued Jul. 31, 1973 (U.S. Pat. No. 3,748,669), each of which is hereby incorporated by reference in its entirety, disclose pressure compensating mixtures which are generally characterized by having a quantity of microbeads dispersed in a flowable liquid medium. Disadvantages of such mixtures include their weight, head pressure and memory. The liquid described in those patents is formulated for certain flow characteristics and the microbeads are merely added because of their low specific gravity to reduce the total weight of the mixture. The resulting mixture is still very heavy because the light microbeads are not used to replace a substantial amount of the heavy liquid, but are instead used only to provide a slight weight reduction of the mixture compared to the use of a liquid alone.

A U.S. patent to Robert W. Weile issued Jan. 5, 1971 (U.S. Pat. No. 3,552,044) discloses a conformable pad filled with elastomeric particles covered with a lubricant (column, lines 34–38). This patent is incorporated by reference herein in its entirety. The elastomeric particles are not round or microspheres, and therefore do not accomodate a sliding and rolling contact. Rather, the elastomeric particles are made from rods and have flat ends that would interfere with the free movement of particles in Applicant's composite mixture. The irregular shape of the particles provides a high resistance to flow and shear.

U.S. patent to Reginald Dyson issued Jul. 13, 1976, (U.S. Pat. No. 3,968,530), which is incorporated by reference herein in its entirety, discloses a body support means which is characterized by a relatively viscous fluid and an insoluble filler. The preferred viscous fluid is a gelatin or cellular gelatin material, or a mixture of sodium carboxymethyl cellulose and water. The fluid and filler mixture disclosed in this patent has the disadvantage of being slow to flow in response to pressure, thus having a high shearing force and being prone to cause skin damage. The fluid and filler mixture is also present in an amount to more than thinly coat the entire surface of the microbeads, and to provide a volume that is substantially more than the volume of the interstitial spaces of the microbeads. The resulting mixture is also heavy because the amount of liquid is substantially more than required to thinly coat the entire surface of the microbeads. The amount of the viscous fluid confers head pressure to the flowable mixture, and the microbeads are not in sliding and rolling contact with each other.

A U.S. patent to Chris A. Hanson issued Apr. 11, 1978 (U.S. Pat. No. 4,083,127) relates to a pressure compensating mixture which is characterized by having a quantity of microbeads dispersed in a flowable liquid medium. This patent is hereby incorporated by reference in its entirety. The preferred flowable material is a mixture consisting essentially of wax and oil, preferably a petroleum based oil, and microbeads. The wax and oil mixture is present in an amount to more than thinly coat the entire surface of the microbeads, and to provide a volume that is substantially more than the volume of the interstitial spaces of the microbeads. The resulting mixture is also heavy because the amount of liquid is substantially more than required to thinly coat the entire surface of the microbeads. The amount and characteristics of the wax and oil mixture confer memory to the flowable mixture, and the microbeads are not in sliding and rolling contact with each other.

A U.S. patent to Frank D. Werner and Marvin A. Luger issued Oct. 29, 1968 (U.S. Pat. No. 3,407,406) relates to a conformable pad which is characterized by having a quantity of microbeads dispersed in a waxy, greasy or oily liquid lubricant such as grease or oil. This patent is hereby incorporated by reference in its entirety. The lubricant causes the microbeads to stick together, and to provide padding that will not change in shape in response to transient or short-time forces. The amount of the lubricant, and the resistance to shape change of the lubricant and bead mixture, confers substantial memory to the flowable mixture, thus having a high shearing force and being prone to cause skin damage. Werner states that a special liquid coating is added to the pad material to cause the small spheres of the pad material to stick together (column 3, lines 6–8; column 7, lines 3–5; column 11, line 31). In contrast with this feature, the present invention uses a lubricant to reduce friction between the spherical objects and to provide maximum movability of the spherical objects with respect to each other in all three dimensions, resulting in a low memory and low shear threshold padding material. The Werner pad will not change shape in response to transient or short-time forces (Werner at column 5, lines 41–43; column 7, lines 38–40). In contrast, Applicant's padding material will deform, shear or change shape in response to the slightest force or pressure, thereby reducing force and damage to body tissue. Applicant's invention has these features because of Applicant's choice of slightly lubricated spherical objects, not spherical objects dispersed in a liquid or gel, and not spherical objects held together with a sticky substance.

A U.S. patent to Philipp Schaefer issued Feb. 24, 1981 (U.S. Pat. No. 4,252,910) relates to a material for resilient, conforming pads, cushions and supports. This patent is hereby incorporated by reference in its entirety. The material comprises elastic, gas-filled microparticles formed into a mass by a thermoplastic bonding agent. The material is semi-liquid at body temperature. One feature of the material is that below body temperature, the material is solid, and therefore, is very resistant to flow under cold conditions. Contour-linings made of such a material were resilient to normal shocks associated with use of the lining. The resistance of the material confers substantial memory to the flowable mixture, thus having a high shearing force and being prone to cause skin damage.

The following United States Patents relate to cushioning devices and their construction: U.S. Pat. No. 5,163,196 dated Nov. 17, 1992 in the name of Robert H. Graebe et al.; U.S. Pat. No. 5,052,068 dated Oct. 1, 1991 in the name of Robert H. Graebe; U.S. Pat. No. 4,698,864 dated Oct. 13, 1987 in the name of Robert H. Graebe; U.S. Pat. No. 5,111,544 dated May 12, 1992 in the name of Robert H. Graebe; U.S. Pat. No. 5,369,828 dated Dec. 6, 1994 in the name of Robert H. Graebe; U.S. Pat. No. 5,018,790 dated May 28, 1991 in the name of Eric C. Jay; and U.S. Pat. No. 4,953,913 dated Sep. 4, 1990 in the name of Robert H. Graebe. Each of these patents is hereby incorporated by reference in its entirety.

The following United States Patents relate to filler materials for various devices such as toys and balls: U.S. Pat. No. 5,190,504 dated Mar. 2, 1993 in the name of Mark A. Scatterday; U.S. Pat. No. 5,335,907 dated Aug. 9, 1994 in the name of Donald Spector; U.S. Pat. No. 4,952,190 dated Aug. 28, 1990 in the name of Howard R. Tarnoff et al.; U.S. Pat. No. 3,748,779 dated Jul. 31, 1973 in the name of Cherk et al.; U.S. Pat. No. 4,744,564 dated May 17, 1988 in the name of Yamada; U.S. Pat. No. 3,518,786 dated Jul. 7, 1970 in the name of J. H. Holtvoigt; U.S. Pat. No. 4,256,304 dated Mar. 17, 1981 in the name of Tommy L Smith et al.; and U.S. Pat. No. 4,467,053 dated Aug. 21, 1984 in the name of Richard A. Markle. Each of these patents is hereby incorporated by reference in its entirety.

Background information related to the invention is described in U.S. patents to Terrence M. Drew issued Apr. 20, 1993, (U.S. Pat. No. 5,204,154), John C. Dinsmoor issued Apr. 13, 1993 (U.S. Pat. No. 5,201,780), Chris A. Hanson issued Sep. 15, 1992 (U.S. Pat. No. 5,147,685), Adrian Q. Rojas issued Jan. 14, 1992 (U.S. Pat. No. 5,079,786), Hubert P. M. Pollmann issued Jan. 14, 1992 (U.S. Pat. No. 5,079,787), Eric C. Jay issued May 28, 1991 (U.S. Pat. No. 5,018,790), Terrence M. Drew et al. issued May 14, 1991 (U.S. Pat. No. 5,015,313), Eric C. Jay issued Jun. 27, 1989 (U.S. Pat. No. 4,842,330), Eric C. Jay issued Aug. 9, 1988 (No. 4,761,843), Eric C. Jay issued Feb. 23, 1988 (U.S. Pat. No. 4,726,624), Donald H. Shaktman issued Dec. 1, 1987 (U.S. Pat. No. 4,709,431), Eric C. Jay issued Apr. 28, 1987 (U.S. Pat. No. 4,660,238), and Eric C. Jay issued May 13, 1986 (U.S. Pat. No. 4,588,229), each of which is hereby incorporated by reference in its entirety.

The following U.S. Patents relate to cushioning pads and mattresses: U.S. Pat. No. 5,103,518 dated Apr. 14, 1992 in the name of Keith Gilroy et al.; U.S. Pat. No. 5,020,176 dated Jun. 4, 1991 in the name of Derek P. Dotson; U.S. Pat. No. 5,010,608 dated Apr. 30, 1991 in the name of Richard I. Barnett et al.; U.S. Pat. No. 4,945,588 dated Aug. 4, 1990 in the name of Daniel G. Cassidy et al.; U.S. Pat. No. 4,292,701 dated Oct. 6, 1981 in the name of John Woychick; U.S. Pat. No. 4,472,847 dated Sep. 25, 1984 in the name of Clifford E. Gammons et al.; and U.S. Pat. No. 3,462,778 dated Aug. 26, 1969 in the name of J. K. Whitney. Each of these patents is hereby incorporated by reference in its entirety.

Prior art bladders, typically made of a rubber or plastic film material by processes such as welding of films, rotational molding, or dipping, typically could only contain a liquid filler, such as a glycerin, oil or other liquid, for a period of months before the glycerin, oil or other liquid began to migrate through the bladder wall, causing a mess and changing the properties of the filler in the cushion. An exception to this was prior art silicone fluids, which had less tendency to migrate through rubber or plastic bladders. Cushioning products made using silicone fluid are very expensive and heavy, however, making them undesirable in light of the invention. The prior art alternative to silicone fluids was non-fluids, such as petroleum jelly and other very thick compositions that would not flow readily and had a very high resistance to shear. Of course, neither silicone fluid nor petroleum jelly are easily washable since neither is water soluble, creating clean-up problems whenever such a material is leaked or spilled.

Flotation devices, such as life vests, typically included a flotation material such as foam with small air bubbles throughout its interior. While such flotation material typically had a low specific gravity, it was usually semi-rigid or stiff and was uncomfortable to wear. The stiffness of the flotation material caused flotation devices such as life vests to restrict body movement of the wearer and result in discomfort. When a flotation device is made using the invented composite mixture, flotation qualities approaching the flotation qualities of prior flotation materials are provided, and the deformable, flowable and shearable nature of the composite mixture permits it to respond to movement of body parts quickly and with little resistance resulting in a flotation device which does not restrict movement or activity. The composite mixture of the present invention has a further advantage as a flotation material because it may be inserted into containers of irregular shape and provide the containers with flotation characteristics. No forming of the composite mixture would be required as with prior foam flotation materials.

SUMMARY OF THE INVENTION

The prior art difficulty in providing a lightweight, deformable, flowable and shearable material that does not have shape memory and is particularly useful for use as padding and in cushions intended to be in contact with a patient's skin, or useful for constructing flotation devices. This limitation of the prior art is overcome by the invented composite mixture of spherical objects lightly lubricated but with a quantity of lubricant insufficient to disperse microspheres in the lubricant. The composite mixture can be used in cushions or padding to equalize pressure across the entire area of skin contacted. In the preferred embodiment, the composite mixture has a low shearing force threshold, is lightweight, does not substantially vary in performance characteristics with temperature, does not feel cold to the touch and warms to body temperature quickly. When hollow spherical objects or spherical objects with gaseous interiors are used, the composite mixture takes on insulative qualities as well. The composite mixture of the invention may be encased within a flexible bladder or container and used as a cushion or padding.

It is an object of the invention to provide a cushion which distributes pressure across the contact area of the cushioned object as equally as possible. The invention achieves this objective by providing a cushion which readily flows by virtue of a pliable container which contains a composite mixture that exhibits low viscosity under deforming pressures, thereby conforming without memory to the irregular contour surfaces of the object being cushioned to provide substantially equal supporting force across the entire area supported.

It is an object of the invention to provide a cushion which has a low shearing force threshold when rapidly sheared. The invention achieves this objective by utilizing a flexible bladder as container for the composite mixture and a composite mixture which is quick to flow, deform, shear and respond to body movement by having low viscosity under deforming pressures but ceasing to flow when pressure is removed, thereby having little or no head pressure or memory. As the object being cushioned moves with respect to the cushion, the bladder wall nearest the cushioned object is free to move with the cushioned object, within certain limits, and the composite mixture offers little resistance to internal flow and shearing. The bladder walls are typically not anchored to each other except for sealing, and the composite mixture does little to inhibit movement of the bladder wall, instead moving with the cushioned body in response to body movement. In this way, shearing force threshold is minimized when the invention is used as compared with the viscous cushioning gels of the prior art.

It is an object of the invention to provide a cushion which is lightweight. The preferred composite mixture uses hollow spheres and an amount of lubricant sufficient to lightly coat the exterior surfaces of the spheres but inadequate to cause any dispersion of the spheres in the lubricant. The hollow spheres have a very low specific gravity due to the fact that they are essentially a spherical shell with an interior void or interior gaseous atmosphere comprising most of their volume. When used in conjunction with a modest amount of lubricant that has a low to moderate specific gravity and with a lightweight bladder material, the invention provides a very lightweight cushion or flotation device compared to gel cushions available in the prior art.

It is an object of the invention to provide a cushion which does not feel overly cold to the touch and which quickly warms to body temperature. The composite mixture employed in the preferred embodiment of the invention has a low thermal mass and a low coefficient of heat transfer compared to prior art cushioning gels because of the insulative properties of the hollow spheres. In alternative embodiments of the invention, a bladder with insulating qualities is employed as well. Thus, the invention can provide a cushion which substantially reduces the prior art problem of being cold to the touch. Alternatively, the invention could be used in wet suits for both its insulative and flotation properties.

It is an object of the invention to provide a cushion which has performance characteristics that do not vary substantially with temperature. The spherical objects used in the composite mixture of the invention exhibit no change or an undetectable change in performance with variations in temperature in a seat cushion. In the preferred embodiment of the invention, lubricant is used which has low variation in lubriciousness in the range of temperatures to which seat cushions are normally subject. In prior art gels, the fluid characteristics (such as viscosity) dictate the flowability and shearability of the gel, resulting in changes in performance with temperature due at least in part to changes in viscosity. In contrast, the present invention depends only on the lubriciousness or slipperiness of the medium used to lubricate the spherical objects of the invention. Because lubriciousness is not overly affected by viscosity changes, the flowability and shearability of the composite mixture of the present invention is not substantially affected by changes in temperature. Thus, the invention does not substantially suffer from variation in performance characteristics over a range of temperatures.

It is an object of the invention to provide a cushioning medium that does not break down or separate into its constituent parts over time. The spherical objects used in the preferred embodiment of the invention are stable, resistant to wear or breakage, and maintain their shape and structural integrity over very long periods of time, far in excess of the life of a prior art cushion. The lubricant employed in the preferred embodiment of the invention is chemically stable and does not separate into its constituent components during use as prior art gels do. Since the spheres are lightly lubricated and not dispersed in the lubricant, there is no tendency for the spheres to float out. The lubricant of the most preferred embodiment effectively functions as a very high molecular polymer which resists leaking through the bladder. The lubricant of the most preferred embodiment may also have a very low vapor pressure and thereby resist evaporation. Thus, the composite mixture of the invention will endure over time without degradation typical of prior art fluids and foam.

It is an object of the invention to provide a cushion bladder which prevents migration of the liquid or lubricant of a cushioning medium within the bladder to the exterior of the bladder. This object is achieved by use of a visco-elastic lubricant as part of the cushioning medium. As the visco-elastic fluid has great affinity for itself due to cross linking of its molecules, it lacks a tendency to migrate through the bladder as prior art oils and liquids did. This object is also achieved by using the invented fabric-coated film bladder material.

It is an object of the invention to provide a cushion with a composite mixture having a lubricant with additional user-friendly properties. The lubricant employed in the invention is preferably non-toxic and non-staining. Thus, the composite mixture of the invention will not pose a health risk to the user.

DESCRIPTION OF THE PREFERRED EMBODIMENTS

Figure 1:
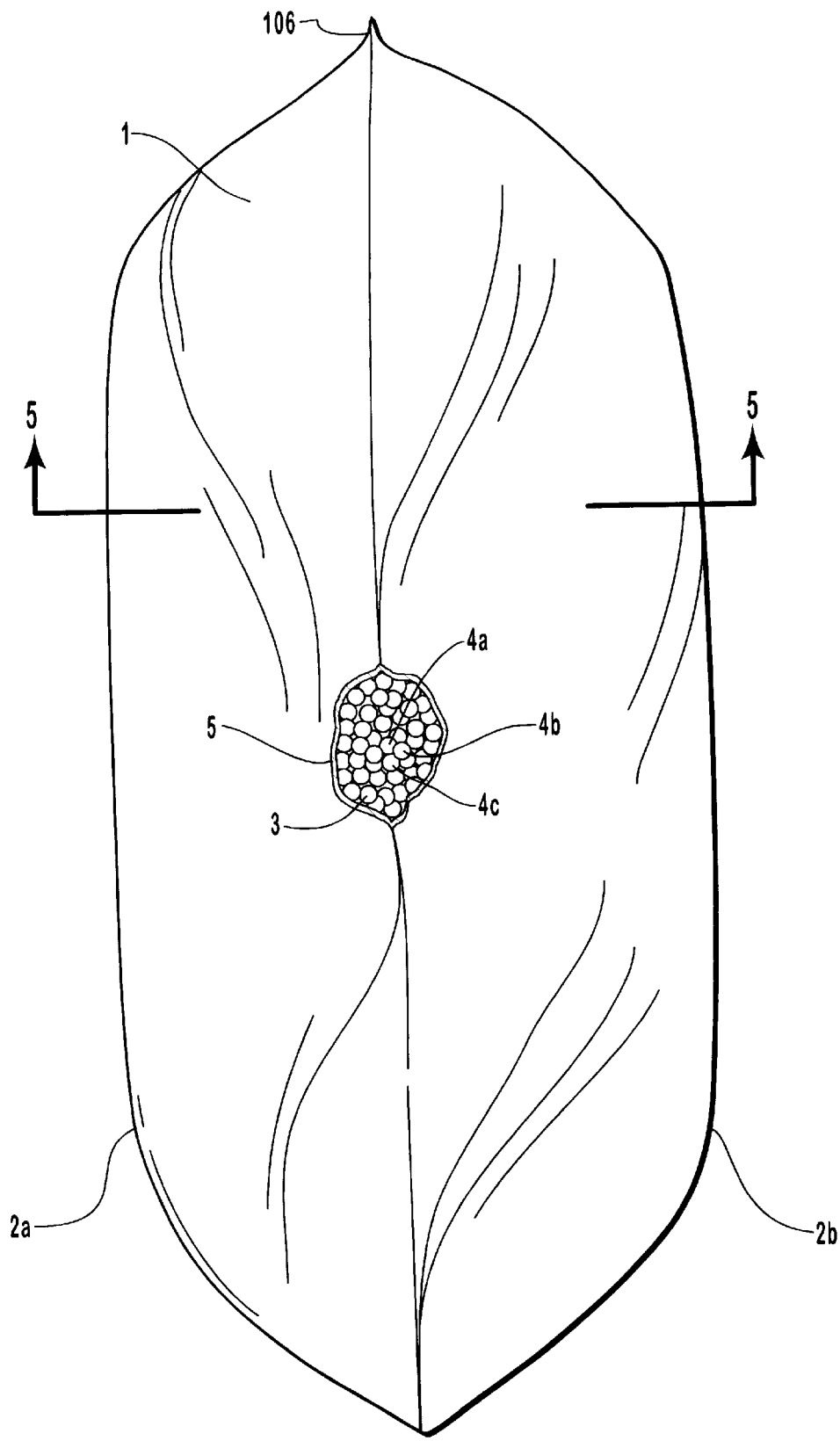
FIG. 1 depicts a preferred embodiment of the composite mixture of the invention employed within a flexible bladder.

Referring to FIG. 1, one preferred embodiment of the composite mixture of the invention within a flexible bladder 1 is shown. The flexible bladder 1 has bladder walls 2a and 2b and serves as a means for containing the composite mixture of the invention in flexible fluid-tight confinement. The bladder may have a seam 6 where it was sealed. Although the bladder walls 2a and 2b are flexible in the preferred embodiment, filling the bladder 1 to capacity with composite mixture would greatly reduce or eliminate possible movement of the bladder walls 2a and 2b and inhibit the cushioning effect of the invention.

In the center of the bladder 1 is shown a cut-away depicting the composite mixture 3 of the invention. The composite mixture 3 in the preferred embodiment of the invention has numerous spherical objects 4a, 4b and 4c thinly coated with a lubricant 5 to enable movement of the spherical objects 4a, 4b and 4c with respect to each other in all three dimensions by low-friction rolling and sliding. The amount of lubricant 5 used in the invention is a quantity sufficient to substantially coat the exterior surfaces of substantially all of the spherical objects 4a–c, but in a quantity less than would cause dispersion of the spherical objects 4a–c in lubricant 5 sufficient to significantly physically separate the spherical objects 4a–c from each other. Thus, the composite mixture 3 is a quantity of spherical objects 4a–c which have slightly lubricated exterior surfaces so that they may move with respect to each other in low-friction sliding and rolling contact. The composite mixture is not a lubricant or other liquid which contains dispersed spherical objects within it.

The behavior of spherical objects 4a, 4b and 4c in the composite mixture 3 is similar to that of oiled ball bearings in sliding and rolling contact with each other, providing little resistance to movement in any direction. This permits the composite mixture 3 to deform in response to a deforming force, including any flowing or shearing movement of the composite mixture required to accomodate such deformation with little resistance. Because the composite mixture 3 is composed of lightly lubricated spherical objects (e.g. discrete solid particles) rather than being composed of a viscous liquid like prior art fluids, the composite mixture does not have head pressure and has no tendency to return to its original shape after the removal of a deforming force, thus having no memory.

Figure 2:
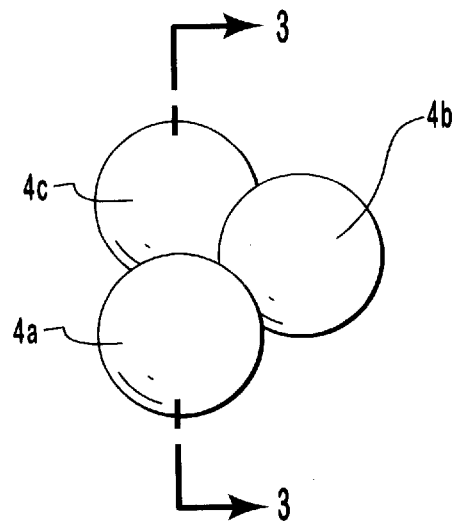
FIG. 2 depicts three spherical objects of the invention in rolling and sliding contact with each other.

FIG. 2 depicts three spherical objects 4a, 4b and 4c in sliding and rolling contact with each other. Use of perfect or nearly perfect spheres facilitates the most efficient and lowest friction movement of the spherical objects against each other, but imperfect shapes or even objects with flat or rough sides could be used. Any of the spherical objects 4a, 4b or 4c can easily roll and slide with respect to the other spherical objects as shown.

Figure 3:
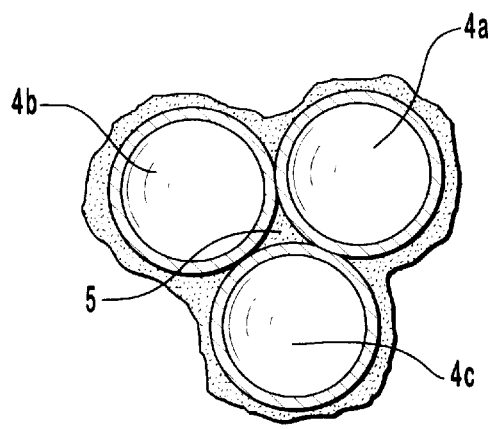
FIG. 3 depicts a cross-sectional view at A—A of three spherical objects of the invention in rolling and sliding lubricated contact with each other.

FIG. 3 depicts a cross-sectional view of the spherical objects of FIG. 2 at 3—3. In the preferred embodiment depicted in FIG. 3, hollow spherical objects 4a, 4b and 4c are utilized and a lubricant 5 is present on the exterior surfaces of the spherical objects to further facilitate their movement relative to each other. The combination of low-friction spherical objects 4a, 4b, and 4c with a friction-reducing lubricant 5 facilitates very efficient movement of the spherical objects with respect to each other, offering little resistance to movement in any direction and achieving the desired flow and shear characteristics of the invention. The movement may be either from rolling or sliding of the spherical objects 4a, 4b and 4c with respect to each other.

Figure 4:
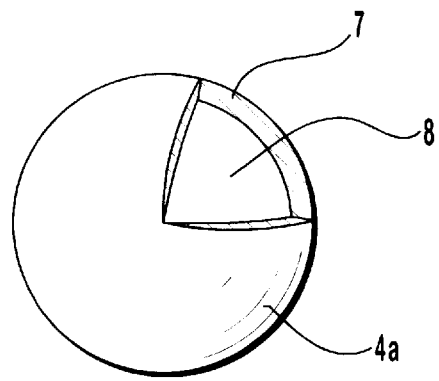
FIG. 4 depicts a partial section of a hollow spherical object used in one preferred embodiment of the invention.

FIG. 4 depicts a partial section of a spherical object 4a used in one preferred embodiment of the invention. Shown are the spherical object rigid outer shell 7 and spherical object interior 8. The spherical object 4a has an interior 8 that may be solid or hollow, and the interior may be a vacuum or a gaseous interior. In alternative embodiments of the invention, spherical objects which have liquid or solid interiors are used. The preferred embodiment of the invention utilizes spherical objects 3 with an inert gaseous atmosphere in their interiors 8. If a shell 7 of low density is used, the combination of shell 7 and hollow or gaseous interior 8 results in a spherical object 4a with a very low specific gravity.

The spherical objects 4a, 4b and 4c may be entirely spherical, oblong, egg-shaped, spherical with a flat spot, multi-sided such as octagonal, rough-sided or otherwise. Nearly perfect spherical shapes with smooth exteriors are preferred, although the ones mentioned above or others could be used as substitutes and are all collectively referred to herein as "spherical objects." As mentioned above, the spherical objects may be hollow, solid, or may have gaseous, liquid or solid interiors, although gaseous interiors are used in the preferred embodiment. The specific gravity of the spherical objects used in most preferred embodiment of the invention is no more than 0.02. In other embodiments of the invention, heavier walls partially hollow interiors, such as a lattice interior or others, may be used, typically resulting in a greater specific gravity.

The spherical objects used in the invention are microspheres which are commonly available commercially, with walls made of metal, glass, carbon, mineral, quartz, and/or plastic and having inert gaseous atmospheres sealed within their interiors. Microspheres of other materials would be suitable for use in the invention as well. In the most more preferred embodiment of the invention, the microspheres are made of a plastic such as acrylic, or phenolic. In the most preferred embodiment of the invention acrylic microspheres used are PM 6545 available from PQ Corporation of Pennsylvania. In another preferred embodiment of the invention, EXPANCEL phenolic microspheres from Expancel of Sweden.

The interiors of the microspheres could be entirely hollow (i.e. having an interior vacuum) or could have gaseous, solid or liquid interiors. The microspheres typically have diameters less than 2000 microns. A common range of commercially available microsphere diameters is about 5 to about 200 microns.

In the preferred embodiment of the invention, the spherical objects used are plastic-walled microspheres with a diameter in the range of about 10 to about 200 microns. These microspheres have a specific gravity of about 0.02. Microspheres of other sizes could be used as well. For example, spherical objects of larger dimensions, such as 0.25 inches in diameter, could be employed, although the cushioning surface provided by such spherical objects would be bumpy rather than smooth. The microspheres used in the preferred embodiment of the invention are very small, as indicated above, and appear as fine dust to the naked eye, there being thousands of such microspheres per cubic inch. When lightly lubricated, the resultant composite mixture appears homogeneous.

In a preferred embodiment of the invention the spherical objects have an elastic characteristic, such that the microspheres can be compressed to less than 20% of their original volume and rebound to about 100% of their original volume when the compressive force is removed. These microspheres are also resistant to a pressure of up to about 2,000 psi without rupturing. These characteristics add to the durability and cushioning effect of the composite mixture using such microspheres.

The lubricant 5 used in the invention may be any lubricant selected from the group consisting of oils, greases, silicone-based lubricants, vegetable-based lubricants, petroleum-based lubricants, mineral-based lubricants, water-based lubricants, synthetic lubricants, or any other friction reducing substance. In one embodiment of the invention, the lubricant is a liquid soap or detergent. One such mixture which may be used is a bubble-blowing solution known as MR. BUBBLES, available from Tootsietoy, a division of Strombecker Corporation of Chicago, Ill. Another such detergent-type lubricant used in a preferred embodiment of the composite mixture is coco diethanolamide, a common ingredient in shampoos. Coco diethanolamide resists evaporation, is stable, relatively non-toxic, non-flammable, readily soluble in water without staining and does not support microbial growth. Coco diethanolamide provides a highly desirable level of friction reduction to permit the spherical objects of the invented composition to readily slide and roll in contact with each other. Many different soap or detergent compositions could be used as well, with a preference for more lubricous and sudsable mixtures.

In another embodiment of the invention, SUPREPULL WIRE AND CABLE PULLING LUBE WITH TEFLON available from Synco Chemical Corporation of Bohemia, N.Y. is used. This is a water-based, non-toxic, odorless and non-flammable lubricant. In another embodiment of the invention, a lubricant comprising deionized water, propylene glycol, isopropanol, polyethylene oxide, and methylparaben is used. PERMATEX INDUSTRIAL SUPER LUBE MULTI-PURPOSE SYNTHETIC LUBRICANT WITH TEFLON which is commercially available from Permatex Industrial Corporation of Avon, Conn. may also be used.

The lubricant 5 of the invention may also be any lubricous visco-elastic fluid. The inventor prefers the use of a visco-elastic fluid as the lubricant when maximum longevity of a cushioning product is desired, due to the tendency of visco-elastic fluids not to bleed through bladder walls. As used herein the term "visco-elastic fluid" is defined to mean that the faster the fluid is deformed, the stronger the tendency of the fluid to resist the deformation. The visco-elastic fluid of the preferred embodiment is a mixture of molecules which are reversibly cross-linked, such that the linkages between the molecules can be relatively easily sheared with a mechanical force. As used herein, the term "cross-linked" refers to any type of reversible intermolecular or intramolecular bonding, including, but not limited to covalent, ionic, hydrophobic, Van der Waals and bonding. Bonds formed by reversible cationic or anionic polymerization reactions are also intended to be comprehended within the scope of the term "cross-linked" as used herein.

The cross-linked linkages are most easily sheared by a slow mechanical force. A quick mechanical force will tend to move a large quantity of visco-elastic fluid due to the fluid's affinity for itself, but a slow mechanical force will tend to shear cross-linkages, resulting in the movement of only a small quantity of fluid.

After the cross-linked linkages are sheared with a mechanical force, such as by a person sitting on a seat cushion which includes microspheres and a visco-elastic fluid as a lubricant, the reversibility of the molecular bonds is facilitated if enough time is available for the free ends of the molecules to establish new bonds with other molecules that will help pull the molecules away from the molecules to which they were originally bonded. Thus, the visco-elastic fluid and the composite mixture itself, a reasonably short period of time after experiencing a mechanical force, return to their original characteristics as a result of reestablishing cross-linking of the visco-elastic fluid.

Because the visco-elastic fluid (i.e. the lubricant) is extensively and reversibly bonded, the quantity of the visco-elastic fluid within a bladder essentially behaves as one large molecule. Thus, a given quantity of the visco-elastic fluid has a resistance to very rapid flow, but is readily deformable under a continual force and continually serves to lubricate the spherical objects when included in the invented composite mixture. In the most preferred embodiment of the invention, the visco-elastic fluid has an affinity for itself which resists forces which would cause the fluid to migrate through the walls of any container holding the composite mixture. This yields a result that solves a difficult problem of the prior art. The inventor found that although suitable composite mixtures could be formulated, over time the lubricant of the composite mixture tended to migrate through intermolecular spaces of the flexible bladder materials used by the inventor. When a visco-elastic fluid is used, however, the visco-elastic fluid's affinity for itself, or in other words, its desire to behave as a single molecule, prevents the visco-elastic fluid from migrating through prior art bladder materials. The result is a composite mixture that can be retained within a thin, flexible bladder for very long periods of time.

The visco-elastic fluid of the invention may include a single compound or a mixture of compounds. The lubricant may be any visco-elastic fluid with sufficient lubricity to reduce the coefficient of friction between contacting spherical objects and not prevent sliding and rolling of said spherical objects with respect to each other. In a preferred embodiment of the invention, the visco-elastic fluid may include a principle molecule (such as a monomer or a polymer which is capable of cross-linking with itself) and an intermediate molecule (a cross-linking agent). The principle molecule may include, but it not limited to, propylene glycol (1,2-propanediol), glycerol, and similar chemicals. In the most preferred embodiment of the invention, the principle molecule has lubricous characteristics before cross-linking. A suitable cross-linking agent is cationic acrylamide (sold under the trade name "MAGNIFLOC" by Cytec Industries of West Paterson, N.J.).

In one preferred embodiment of the visco-elastic fluid, the amount of principle molecule may range from about 99.99 to about 90 weight percent, and the amount of cross-linking agent may range from about 0.01 to about 10 weight percent, where the weight percent is based on the total weight of principle molecule (monomer or polymer) and cross-linking agent (intermediate molecule). In a most preferred embodiment of the invention, the lubricant is about 98 to about 99.8 weight percent principle molecule and about 2 to about 0.2 weight percent cross-linking agent. Another most preferred embodiment of the invention uses about 97 weight percent propylene glycol (the principle molecule), about 2 weight percent cross-linking agent (the intermediate molecule), and about 1 weight percent preservative. Another most preferred embodiment of the invention uses about 98.8 weight percent glycerin (the principle molecule), about 0.2 weight percent gelling agent (the intermediate molecule) and about 1.0 weight percent preservative. In the broadest range contemplated by the inventor, the principle molecule will be in the range of about 75 to about 99.99 weight percent, and the cross-linking agent will be in the range of about 0.01 to 25 weight percent.

The lubricant may also include a molecule which functions as both a principle molecule and a cross-linking agent. Such a lubricant may be a bifunctional reagent with functional groups for both receiving and forming reversible cross-links.

FIGS. 6–9 illustrate examples of a visco-elastic fluid comprising a principle molecule and cross-linking agent or a bifunctional molecule. The representations of the principle molecule and cross-linking agent, and of the bifunctional molecule, are intended to be illustrative in nature, and do not reflect the actual molecular structure.

Figure 6:
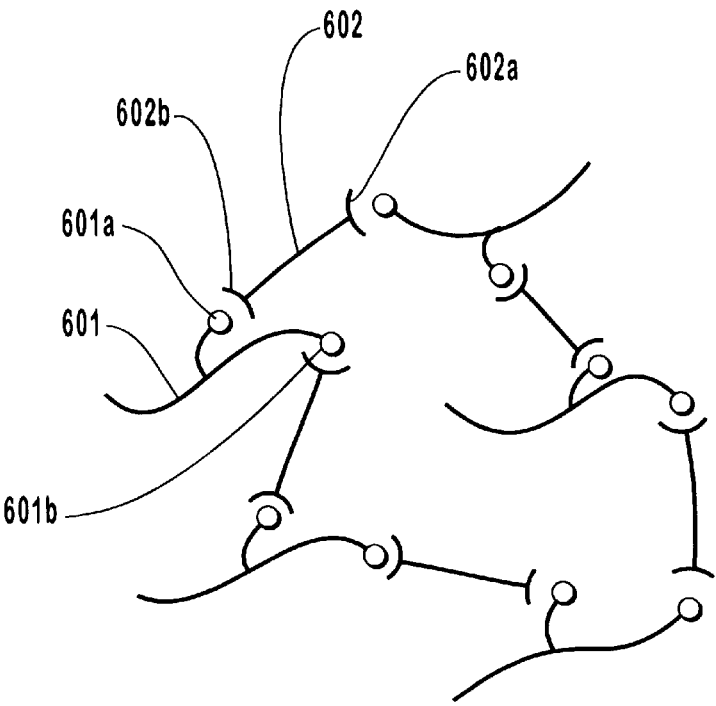
FIGS. 6–9 illustrate three different visco-elastic fluids.
Figure 7:
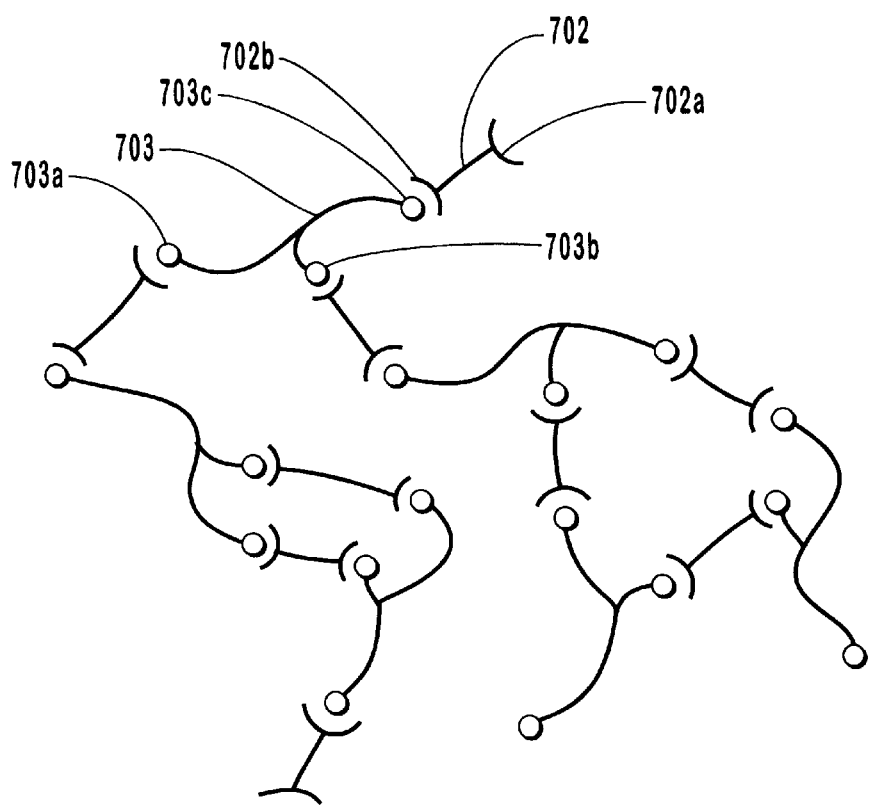

Referring to FIG. 6, an example of a cross-linked visco-elastic fluid is shown. In this example, principle molecule 601 contains two cross-linkable groups 601a and 601b. Cross-linking agent 602 also includes two active groups 602a and 602b, which can form reversible cross-links with groups 601a and 601b. Referring to FIG. 7, a principle molecule including more than two cross-linkable groups is within the scope of the invention. Principle molecule 703 includes three cross-linkable groups 703a, 703b and 703c. Groups 703a, 703b and 703c can form reversible cross-links with groups 702a and 702b on cross-linking agent 702. Cross-linking agents containing more than two functional groups are also within the scope of the invention.

Figure 8:
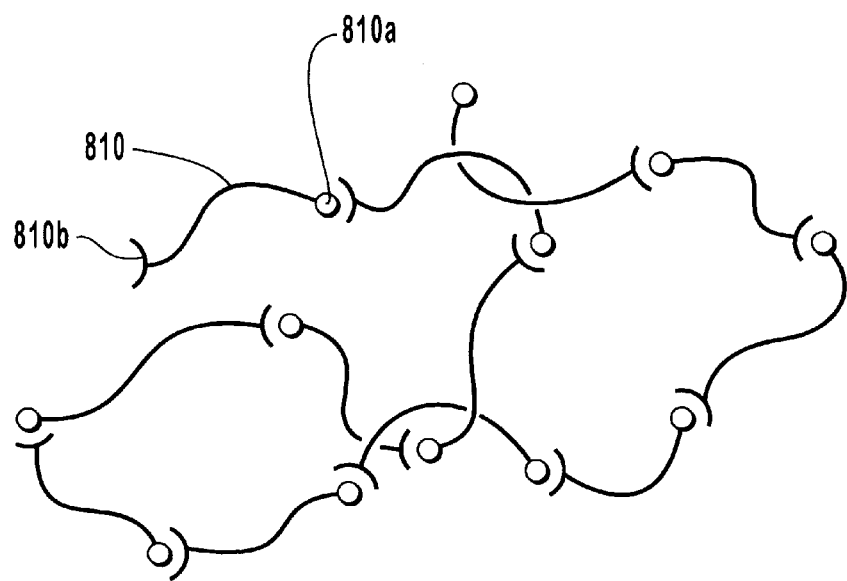
Figure 9:
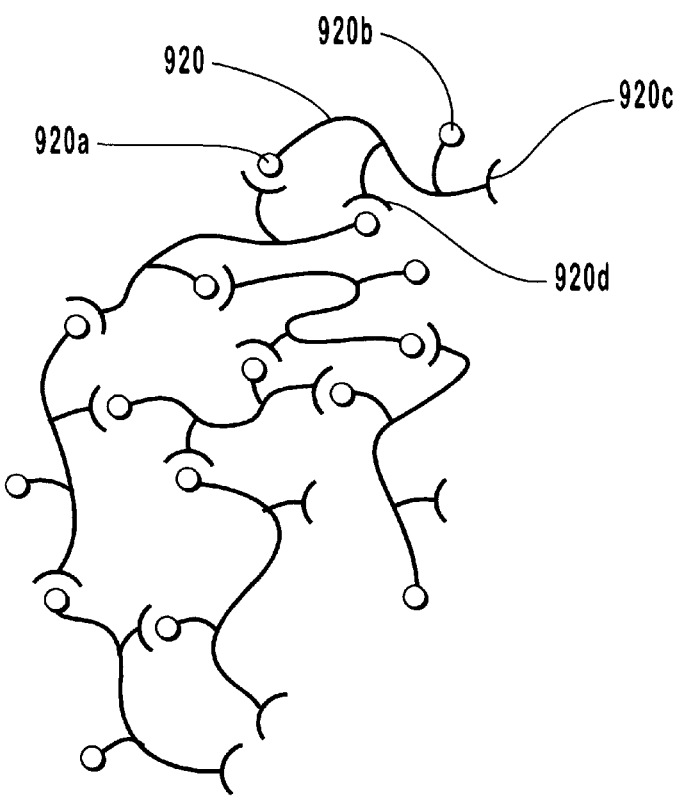

Referring to FIG. 8, a bifunctional visco-elastic fluid is also within the scope of the invention. For example, molecule 810 may include functional groups 810a and 810b, which are capable of forming reversible cross-links with other functional groups 810b and 810a, respectively. Referring to FIG. 9, it is also contemplated that a bifunctional molecule could have more than two functional groups. For the purposes of illustration, molecule 920 has four functional groups 920a, 920b, 920c and 920d, which are capable of forming reversible cross-links.

Figure 10A:
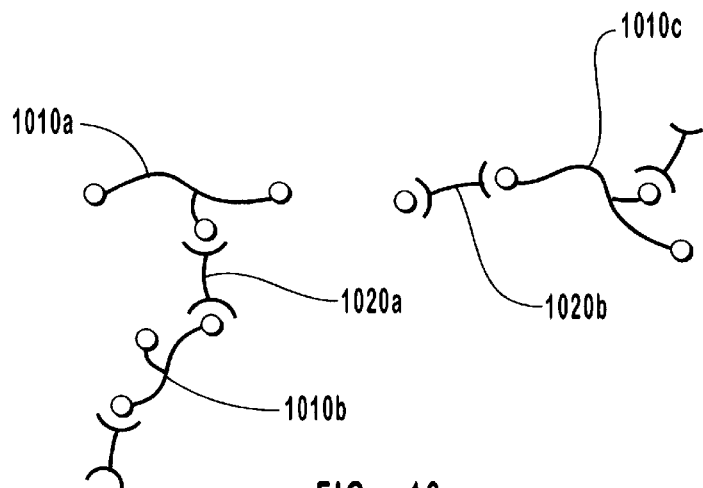
FIGS. 10a, 10b and 10c illustrate shearing and reformation of a visco-elastic fluid of the invention.
Figure 10B:
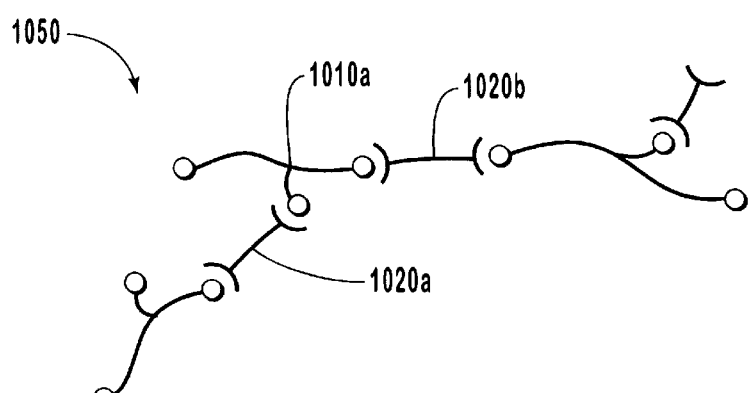
Figure 10C:
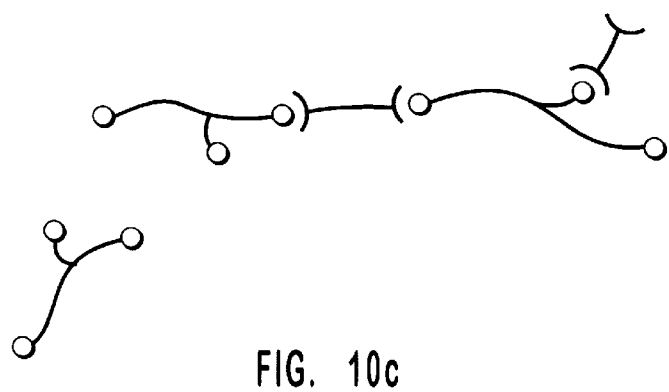

Referring to FIG. 10, an example of the shearing and reformation of reversible cross-links is shown. FIG. 10a shows a hypothetical ordering of principle molecules 1010 and cross-linking agents 1020. Referring to FIG. 10b, when a shear force 1050 is applied, principle molecule 1010a moves away from cross-linking agent 1020a and towards cross-linking agent 1020b. One of the functional groups of principle molecule 1010a forms a cross-link with cross-linking agent 1020b. Referring to FIG. 10c, the reversible cross-link between principle molecule 1010a and 1020a is then sheared. While this example illustrates the shearing and reformation of cross-links between principle molecules and cross-linking agents, the principles underlying this illustrations are also applicable to principle molecules and cross-linking agents containing different numbers of functional groups from those shown, and to bifunctional molecules.

If possible, the lubricant used should have a relatively low specific gravity and not be subject to degradation or break down over time. This helps the invention achieve its objects of being lightweight, durable, and not varying in performance with temperature. In a preferred embodiment of the invention, the lubricant may include a preservative. The preservative should be appropriate for the stabilization of the components of the lubricants. The preservative may inhibit microbial growth and/or stabilize the lubricant against oxidation or other chemical degradation. Any effective amount of preservative is within the scope of the invention. One example of preservatives is a preservative called DANTO-GARD which is available from Lonza Corporation of Fair Lawn, N.J. In the most preferred embodiment of the invention, the amount of preservative is not more than about 1 weight percent, based on the total weight of principle molecule and cross-linking agent.

Preferably, the lubricant used will not be subject to substantial changes in lubriciousness in the range of ordinary outdoor temperatures (0 degrees to +120 degrees Fahrenheit). Many of the preferred lubricants described above exhibit this resistance to lubriciousness change. This avoids substantial variance in essential performance characteristics of the composite mixture with changes in temperature.

It is possible to broaden the lower end of the temperature range in which the invention is intended to function by adding a suitable antifreeze to the lubricant. Suitable antifreezes may include, but are not limited to, propylene glycol and ethylene glycol. In a preferred embodiment of the invention, the antifreeze is preferably non-toxic.

An important object of the lubricant is to facilitate low friction sliding and rolling contact of microspheres with each other to permit flow and shear of the composite mixture. It is not an object of the lubricant to disperse the microspheres in the lubricant and prevent contact of microspheres with each other. The quantity of lubricant required for such dispersion would make the composite mixture unduly heavy and would increase its coefficient of heat transfer and thermal mass due to the reduction of the amount of trapped gases in the form of microsphere interiors. Such a large amount of lubricant would also result in a composite mixture with head pressure and with a greater shear force than desired in the present invention. Therefore, the amount of lubricant used in the invention is a quantity sufficient to substantially coat the exterior surfaces of substantially all of the spherical objects, but in a quantity less than would cause dispersion of the spherical objects in the lubricant sufficient to significantly physically separate the spherical objects from each other. The spherical objects would be considered significantly physically separated if the amount of lubricant provided allowed the spherical objects to float or move in the lubricant independent of each other rather than, as in the invention, continually being in sliding and rolling contact with each other with only a thin film of lubricant interposed between the spherical objects to facilitate their sliding and rolling contact.

The composite mixture of the invention deforms, flows or shears under light pressure but ceases to flow, shear or deform when the pressure is terminated. Prior art cushioning fluids typically continue to flow after pressure has been terminated, sometimes due to gravity and sometimes in any attempt to rebound to their original shape, thus being inferior in performance to the composite mixture of the present invention. Lubricants which impede rather than facilitate sliding and rolling movement of spherical objects with each other, such as stiff wax, would be undesirable because they would not achieve the objects of the invention. The lubricant need only serve to reduce the coefficient of friction of the spherical objects sliding and rolling with respect to each other.

The invention may further include a flexible bladder containing the composite mixture. The flexible bladder in the invention may be any flexible or pliable material in a variety of thicknesses. Suitable materials for the flexible bladder may include, but are not limited to, polyurethane, vinyl, other plastics, latex, rubber, synthetic rubbers, thermoplastic elastomers, EVA's, or any other thin, flexible, fluid impermeable or low-permeability film. The flexible bladder may have one or more layers of such materials disposed on either side of the composite mixture. In a preferred embodiment of the invention, the flexible bladder is fluid-tight, and thereby resists bleeding or evaporation of the lubricant through the walls of the bladder. In the most preferred embodiment of the invention, the flexible bladder is a laminated fabric comprising a woven fabric laminated to a thin, flexible, impermeable or low-permeability film. Such a woven fabric may include a stretchable, strong fabric such as a stretch-knit polyamide (such as that sold under the trade name "LYCRA" by DuPont corporation of Wilmington, Del.). Such a flexible bladder including a laminated fabric may be formed by various known methods of manufacturing or attaching layers of fabric. Such methods may include, but are not limited to, laminating the fabric and film together using heat-welding, radio frequency welding or ultrasonic welding.

Figure 5:
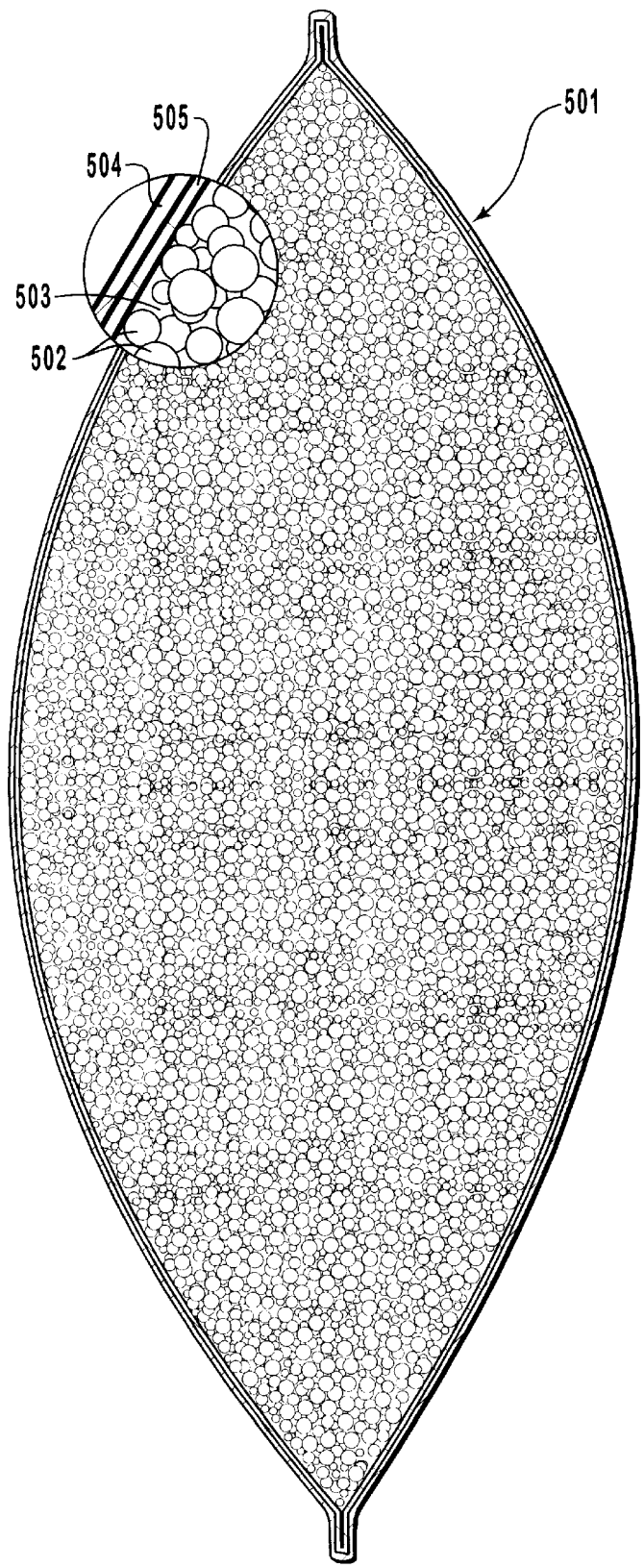
FIG. 5 depicts a cross section of the preferred bladder material of the invention in use containing a quantity of spherical objects which are lightly lubricated with a visco-elastic fluid.

Referring to FIG. 5, a preferred embodiment of the invented bladder 501 is shown containing a quantity of spherical objects 502 which are slightly lubricated with a quantity of visco-elastic fluid 503. The bladder 501 includes a first layer 504 of a stretchable fabric (such as a stretch-knit polyamide) laminated to a film (such as a polyester-based polyurethane or a polyether-based polyurethane). The film layer 504 is disposed toward the fluid 503 and spherical object 502 mixture, and the fabric layer 504 is disposed toward the exterior of the cushion. The stretchable fabric laminated to a film 501 as the bladder is preferred because typically the stretchable fabric will cease to stretch before the film is stretched to the point of damaging its structural integrity. This permits the bladder to be flexible and stretched, but does not result in damage to the film during such stretching, even when the bladder is placed under a great amount of stress or pressure.

The layers of the flexible bladder may be any desired thickness. In a preferred embodiment of the invention, a layer of the bladder is a film of from about 0.003 to about 0.030 inches in thickness, and in a more preferred embodiment, a layer of film is less than about 0.020 inches in thickness. In the most preferred embodiment of the invention, a layer of film is about 0.001 to 0.006 inches in thickness, to provide sufficient flexibility while remaining fluid-tight. The preferred stretchable fabric is a meltable thermoplastic so that it can be heat welded to a thermoplastic film, if desired.

The bladder may be filled with the composite mixture by removing air from the bladder and injecting the composite mixture, thereby preventing any gross air bubbles from being present in the bladder. The bladder should only be partially filled with composite mixture to permit movement of the mixture and to achieve the desired cushioning properties. The volume of composite mixture in the bladder may be increased to provide a stiffer cushion or decreased to provide a more flowable cushion as per physician and physical therapist recommendations for a particular patient.

It would be contrary to the objects of the invention to fill the bladder more than 80% full with composite mixture because the flow and shear characteristics of the composite mixture would be impaired. Also, no gross air bubbles should be included in the finished product or the performance of the device will be reduced. In most embodiments of the invention, not more than 80% of the maximum volume of the bladder is filled with composite mixture, although completely full or nearly empty bladders could be envisioned. On average, bladders are expected to be about 30% to 50% filled by volume with composite mixture. In some embodiments of the invention, cushions may be constructed which include multiple compartment bladders or a plurality of individual bladders. For example, a mattress pad would typically include numerous small individual bladders, while an automobile seat could be constructed either with numerous small individual bladders, from one large bladder or from one compartmentalized bladder having multiple compartments.

The best mode of the invention includes a highly lubricous, visco-elastic lubricant which serves to lubricate a quantity of plastic microspheres contained within a multi-layer bladder that has at least one layer that is a fabric-coated film. The visco-elastic lubricant could be about 98 weight percent propylene glycol principle molecule which is available from Arco Chemical (Newtown Square, Pa.), about 2 weight percent cationic polyacrylamide cross-linking agent (or unpolymerized acrylamide) such as that sold under the trade name MAGNIFLOC, which is available from Cytec Industries (West Paterson, N.J.), and about 1 weight percent preservative such as DANTOGARD which is available from Lonza Corporation (Fair Lawn, N.J.). The weight percentages are based on the total weight of principle molecule and cross-linking agent. The lubricant of the invention may also be about 99.8 weight percent glycerol monomer (glycerin), about 0.2 weight percent cationic acrylamide cross-linking agent and about 1 weight percent preservative.

In the best mode of the invention contemplated by the inventor, the spherical objects are acrylic plastic-walled microspheres in the 10–200 micron diameter range and having a uniform wall thickness and being of spherical configuration. These microspheres have a specific gravity of about 0.02, and elastic characteristic, such that the microspheres can be compressed to less than 20% of their original volume and rebound to about 100% of their original volume when the compressive force is removed. These microspheres are also resistant to a pressure of about 2,000 psi without rupturing. The microspheres are available under the tradename PM 6545 and may be obtained from P.Q. Corporation (Valley Forge, Pa.).

The particular composite mixture which the inventor contemplates as a best mode is a mixture of a lubricous, visco-elastic lubricant comprising about 98 weight percent propylene glycol monomer, which is available from Arco Chemical (Newtown Square, Pa.), about 2 weight percent cationic polyacrylamide such as MAGNIFLOC, which is available from Cytec Industries (West Paterson, N.J.), about 1 weight percent preservative such as DANTOGARD, which is available from Lonza (Fair Lawn, N.J.), and acrylic microscopic spherical objects (PM6545 from P.Q. Corporation of Valley Forge, Pa.) resulting in a specific gravity for the composite mixture of about between about 0.36 to about 0.06, or less.

In the preferred embodiments of the invention, the composite mixture shears more easily than and equalizes pressure better than prior art cushioning gels, but weighs only 20% to 50% as much. Various other preferred embodiments of the invention have higher specific gravities, some being up to and above 0.50 and some being less than 0.2. Achieving a low shear force relies on achieving a low coefficient of friction between the spherical objects such as by using a highly lubricous lubricant and spherical objects with very smooth exteriors. In practice, nearly any lubricant can be used and any type of spherical object can be used, made of almost any material, hollow or otherwise and of nearly any size.

In one preferred embodiment of the invention, preparation of the composite mixture is performed simply by placing the lubricant and spherical objects in a container and mixing until the spheres are reasonably uniformly coated with lubricant. No special preparation steps are required, and the ingredients can be mixed at ambient temperature.

In the most preferred embodiment in which the lubricant includes a visco-elastic fluid, the principle molecule and cross-linking agent are pre-mixed. A preservative may be included at this time. The mixture is then allowed to reversibly cross-link for about two to three days. Constant slow stirring during the cross-linking period, particularly the first half-day, is helpful to promote complete mixing and to prevent stratification of the mixture. When bond formation is near completion, the lubricant is highly lubricous. In this preferred embodiment, bond-formation is essentially complete when, after grasping a "handful" of the lubricant, most of the lubricant can be moved "en mass." In other words, a person can grasp a handful of the lubricant, pull very quickly, and a large portion of the lubricant which was not grabbed but which is cross-linked to that which was grabbed will travel with the grabbed handful.

The microspheres are then mixed with the lubricant until the microspheres are reasonably uniformly coated. No special preparation steps are required, and the ingredients can be mixed at ambient temperature.

The particular flexible bladder which the inventor contemplates as a best mode includes a laminated LYCRA stretch-knit polyamide/polyurethane material and a layer of polyurethane film disposed on either side of the composite mixture. Such a flexible bladder may be formed by placing two extra layers of a polyurethane film on the polyurethane side of a piece of laminated material. The polyurethane side of a second extra layer of laminated material is placed into contact with the polyurethane film. The layers of laminated material and extra polyurethane are then welded together by radio frequency welding, and the lubricated sphere mixture is placed between the two extra polyurethane film layers. The extra layers of film strengthen the weld.

The composite mixture of the invention is a material which has many of the same beneficial physical properties as fluids used in cushioning, but absent the numerous disadvantages of prior art fluids. For example, the composite mixture has a low specific gravity and hence is lightweight, little or no memory, a low shearing force threshold, a low thermal mass and low coefficient of heat transfer, little to no variation in performance over broad temperature ranges, resistance to degradation over time, the mixture relatively evenly distributes pressure over the contact surface area of an object being cushioned, and the mixture has a specific gravity low enough to make it useful for use in flotation devices. The composite mixture is not a mere fluid as found in the prior art. The lubricant is used to reduce the coefficient of friction of the outside surface of the spherical objects (i.e., make them slick), allowing desired sliding and rolling movement between spherical objects but does not serve as a dispersing liquid for the spherical objects. Because lubricants are available that do not break down over time, because microspheres are available that are chemically inert (e.g., glass or acrylic microspheres), and because the preferred lubricant has a great affinity for itself and does not tend to migrate through bladders, a composite mixture can be made such that it lasts indefinitely without change in its properties and can be successfully contained within a cushioning object. The composite mixture of the invention has a lower coefficient of heat transfer than prior art cushioning fluids because the majority of the volume is microspheres and because the interior of the microspheres used in the preferred embodiment have trapped gaseous internal atmospheres, and trapped gas acts as an excellent insulator. As a result, the composite mixture of the invention does not feel as cold to the body that is being cushioned as do cushions using prior art fluids. A low coefficient of heat transfer, such as less than 0.25 btu per hour per foot per degree Fahrenheit is provided in the preferred embodiment of the invention. A low coefficient of thermal mass, less than 0.7 calories per cubic centimeter per degree Celsius, is also provided by the preferred embodiment of the invention.

A very important advantage of the invention is that it provides substantially even distribution of pressure across the contact area of the object being cushioned. This is because the use of the composite mixture within a partially-filled flexible bladder permits the composite mixture to accommodate object protrusions and flow and fill object depressions. As the composite mixture flows to contact as much area of the object as possible, pressure across the contact area of the object is substantially equalized.

Another important advantage of the invented composite mixture is that when used as a filler material for cushions, the composite mixture has no memory, no head pressure (i.e. no gravity flow) readily flows under pressure and readily shears to reduce skin stresses. It also readily conforms to the shape of the body part being cushioned, maximizes the cushioning surface area, and rapidly adjusts when the user moves the body part being cushioned. Additional advantageous features include non-toxicity of the composite mixture, non-evaporative in some embodiments and a non-staining composite mixture. The result is a safe and comfortable cushion that preserves body tissue rather than damaging it like prior art cushions did.

Cushions can be made with the invented composite mixture for any number of applications, including wheelchair seats, wheelchair backs, bicycle seats, bicycle gloves, bicycle handlebar grips, walking shoes, athletic shoes, work boots, ski boots, automobile seats, stadium seats, saddles, secretarial chairs, executive chairs, lounge chairs, lumbar supports, and others. Other applications for the invented material include mattress tops for conventional mattresses, fill material for waterbed-type mattresses, and cushioning pads for hospital beds. The invented composite mixture can be used in applications where insulative qualities are desired, such as the aforementioned stadium seats. The invented composite mixture can also be used in applications where a particular consistency, response or feel is to be achieved, i.e., to fill sports balls, balls for recreational ball jumpy pits (such as are in some McDonald's play areas), lifelike mannequins, and when fluid flow characteristics are desired. The plastic fluid flow characteristics provided by the invention include flowability under deforming pressure, cessation of flow when the pressure is removed (no memory) and lack of flow due to gravity (head pressure) as well as shearability. Finally, the invented composition can be used in flotation devices due to its low specific gravity and the comfort and ease of body movement that it provides the wearer.

While the present invention has been described and illustrated in conjunction with a number of specific embodiments, those skilled in the art will appreciate that variations and modifications may be made without departing from the principles of the invention as herein illustrated, described and claimed. The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A composite mixture comprising:

a) a plurality of spherical objects and b) a quantity of lubricant on the exterior surface of substantially all of said spherical objects, said lubricant being present in a quantity less than would cause dispersion of said spherical objects in said lubricant sufficient such that said spherical objects would be significantly separated from each other by said lubricant;

wherein said spherical objects and said lubricant are mixed together to form the composite mixture;

wherein said lubricant is lubricous and serves to reduce the coefficient of friction between contacting spherical objects;

wherein said spherical objects within said mixture are movable in sliding and rolling contact with each other in all three dimensions to permit flow and shear of the mixture;

wherein the composite mixture flows and shears in response to a deforming pressure exerted on it, said flow and shear being accomplished by said spherical objects moving in rolling and sliding contact with each other; and wherein the composite mixture ceases to flow and shear when the deforming pressure is terminated.

2. A composite mixture as recited in claim 1 wherein said spherical objects comprise elastic spherical objects.

3. A composite mixture as recited in claim 1 wherein said composite mixture has a thermal mass less than 0.7 calories per cubic centimeter per degree Celsius.

4. A composite mixture as recited in claim 1 wherein said composite mixture has a coefficient of heat transfer less than 0.25 btu per hour per foot per degree Fahrenheit.

5. A composite mixture comprising:

a) a plurality of microspheres and b) a quantity of visco-elastic fluid on the exterior surface of substantially all of said microspheres, said visco-elastic fluid being present in a quantity less than would cause dispersion of said microspheres in said visco-elastic fluid sufficient such that said microspheres objects would be significantly separated from each other by said visco-elastic fluid;

wherein said microspheres are movable in sliding and rolling contact with each other in all three dimensions to permit flow and shear of the mixture; and wherein the mixture flows, shears and deforms in response to a deforming pressure, but ceases to flow, shear and deform after the deforming pressure has been terminated.

6. A composite mixture as recited in claim 5, wherein said visco-elastic fluid comprises a principle molecule and a cross-linking agent.

7. A composite mixture as recited in claim 6 wherein said principle molecule is selected from the group consisting of propylene glycol and glycerol.

8. A composite mixture as recited in claim 6 wherein said cross-linking agent comprises cationic acrylamide.

9. A composite mixture as recited in claim 5, wherein said visco-elastic fluid comprises about 98 weight percent propylene glycol and about 2 weight percent cationic acrylamide cross-linking agent, said weight percentages being based on the total weight of principle molecule and cross-linking agent.

10. A composite mixture as recited in claim 5 wherein said lubricant comprises about 99.8 weight percent glycerin principle molecule and about 0.2 weight percent cationic acrylamide cross-linking agent, said weight percentages being based on the total weight of principle molecule and cross-linking agent.

11. A composite mixture comprising:

spherical objects and a lubricant comprising coco diethanolamide;

wherein said spherical objects and said lubricant are mixed together to form the composite mixture;

wherein said lubricant is present on the exterior surface of substantially all of said spherical objects, but in a quantity less than would cause dispersion of said spherical objects in said lubricant sufficient to significantly physically separate said spherical objects from each other and thereby reduce the sliding and rolling contact of said spherical objects with each other;

wherein said lubricant facilitates sliding and rolling contact of spherical objects with each other to permit flow and shear of the composite mixture;

wherein said lubricant is lubricous, serves to reduce the coefficient of friction between contacting spherical objects, and does not prevent sliding and rolling of said spherical objects with respect to each other; and wherein the mixture flows, shears and deforms in response to a deforming pressure, but ceases to flow, shear and deform after the deforming pressure has been terminated.

12. A composite mixture comprising:

spherical objects comprising an outer shell and an inert atmosphere sealed within the outer shell, said spherical objects being less than 2000 microns in diameter, and lubricant comprising a principle molecule and a cross-linking agent;

wherein said lubricant is lubricous, serves to reduce the coefficient of friction between contacting spherical objects, and does not prevent sliding and rolling of said spherical with respect to each other;

wherein said lubricant is present on the exterior surface of essentially all of said spherical objects, but in a quantity less than would cause dispersion of said spherical objects in said lubricant sufficient to significantly physically separate said spherical objects from each other such that more than a thin film of lubricant is interposed between spherical objects and preventing the sliding and rolling contact of said spherical objects with each other;

wherein said lubricant facilitates sliding and rolling contact of spherical objects with each other to permit flow and shear of the composite mixture;

wherein said spherical objects are made from material selected from the group consisting of plastic, glass, metal, carbon, mineral, and quartz; and wherein the mixture flows, shears and deforms in response to a deforming pressure, but ceases to flow, shear and deform after the deforming pressure has been terminated.

13. A composite mixture comprising:

a) a plurality of spherical objects and b) a quantity of visco-elastic fluid on the exterior surface of substantially all of said spherical objects, said visco-elastic fluid being present in a quantity less than would cause dispersion of said spherical objects in said visco-elastic fluid sufficient such that said spherical objects would be separated from each other by more than a thin film of said visco-elastic fluid, and said visco-elastic comprising a principle molecule and a gelling agent;

wherein said visco-elastic fluid comprises a mixture of molecules which are reversibly cross-linked, such that the linkages are easily sheared by a slow mechanical force, and such that new linkages may be reestablished among the molecules of the mixture following cessation of the mechanical force;

wherein said lubricant facilitates sliding and rolling contact of spherical objects with each other to permit flow and shear of the composite mixture;

wherein the composite mixture flows and shears in response to a deforming pressure exerted on it, said flow and shear being accomplished by said spherical objects moving in rolling and sliding contact with each other; and wherein the composite mixture ceases to flow and shear when the deforming pressure is terminated.

* * * * *